J. A. BRIED.
FRICTION CLUTCH.
APPLICATION FILED FEB. 20, 1919.
1,389,855.
Patented Sept. 6, 1921.
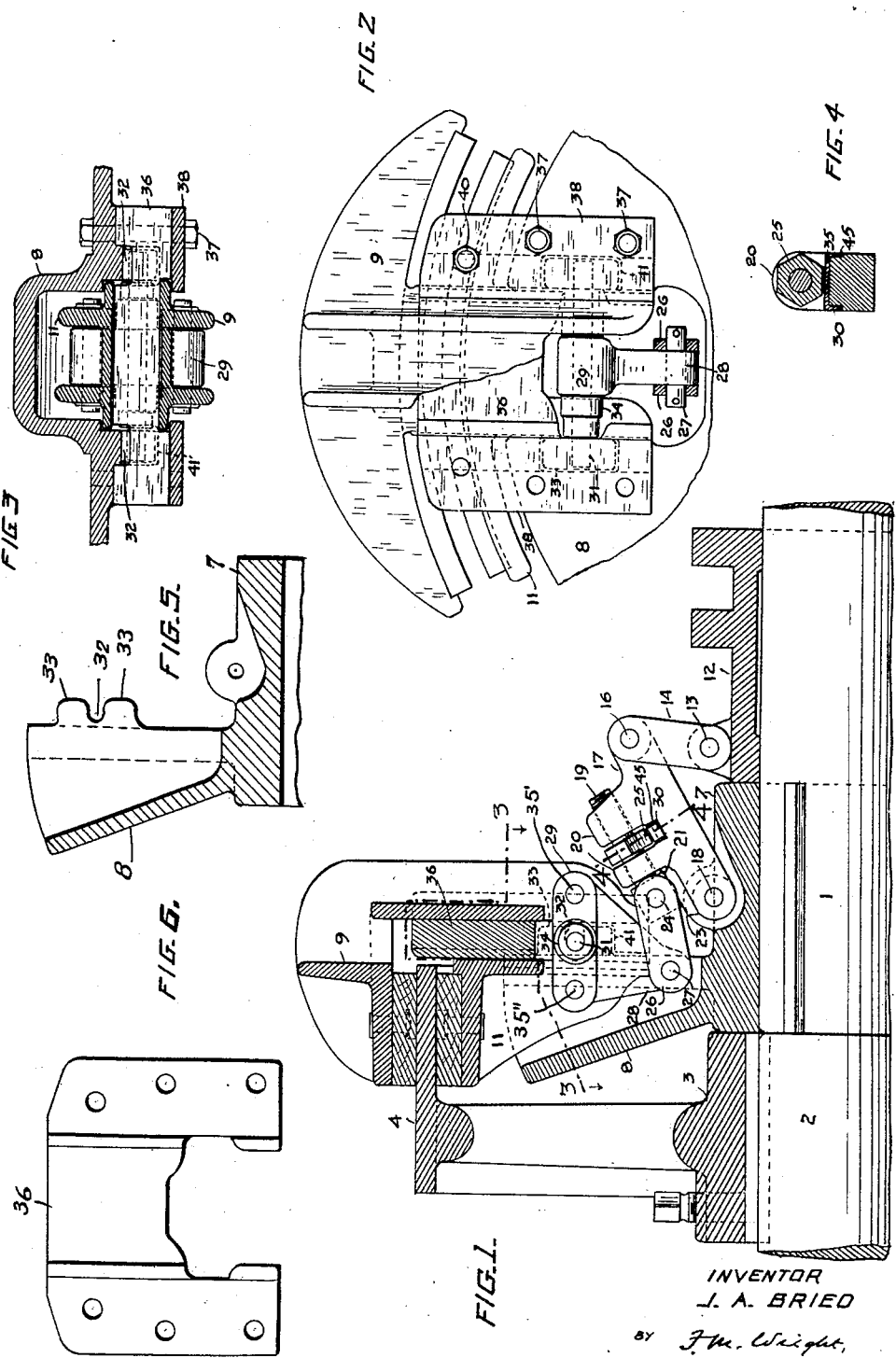
INVENTOR
J. A. BRIED
BY F. M. Wright,
ATT'Y

UNITED STATES PATENT OFFICE.

JULIEN A. BRIED, OF OAKLAND, CALIFORNIA, ASSIGNOR TO MEESE & GOTTFRIED COMPANY, A CORPORATION OF CALIFORNIA.

FRICTION-CLUTCH.

1,389,855.   Specification of Letters Patent.   Patented Sept. 6, 1921.

Application filed February 20, 1919. Serial No. 278,131.

*To all whom it may concern:*

Be it known that I, JULIEN A. BRIED, a citizen of the United States, residing at Oakland, in the county of Alameda and State of California, have invented new and useful Improvements in Friction-Clutches, of which the following is a specification.

The present invention relates to improvements in friction clutches and especially in that type of friction clutch wherein a ring member is gripped by inner and outer friction jaws.

The object of the invention is to provide jaw-operating and sustaining members which will be more positive and will permit of a greater accessibility than heretofore and also the clutch parts of which can be disassembled while of a construction as strong as heretofore and which will permit of the simplification of the manufacture of the clutch.

In the accompanying drawing, Figure 1 is a longitudinal section of one-half of my improved friction clutch for connecting two shafts, the shafts themselves being shown in side elevation; Fig. 2 is a broken end view of the clutch; Fig. 3 is a sectional view on the line 3—3 of Fig. 1; Fig. 4 is a detail cross section on the line 4—4 of Fig. 1; Fig. 5 is a broken longitudinal sectional view of the carrier; Fig. 6 is a front elevation of an extension carried by the outer jaw.

Referring to the drawing, 1 and 2 indicate two shafts, ends of which are in close proximity to each other and which are to be made connectible by my improved ring clutch. On the shaft 2 is keyed the hub 3 of a friction ring 4, and on the shaft 1 is secured the hub 7 of a carrier 8, carrying the gripping jaws 9 and 11, and the mechanism for actuating said jaws. On the shaft 2 is a clutch collar 12, slidable usually by manual means, to which collar are pivoted, as shown at 13, ends of links 14, the other ends of which are pivoted, as shown at 16, to one end of a lever 17, the other end of which lever is pivoted, as shown at 18, upon the hub 7 of the carrier 8, said links 14 and lever 17 thus constituting a toggle lever actuated by the longitudinal movement of the slidable collar 12. From the outer edge of said lever 17 extend apertured lugs 20 spaced from each other and through the apertures in said lugs extends an eye-bolt 19 having a head 21 which can slide upon a plane surface 23 on the outer portion of the lever 17. To opposite sides of the head of the eye-bolt are pivoted, as shown at 24, ends of two parallel links 26, the other ends of which are pivoted, as shown at 27, on opposite sides of an arm 28 projecting inwardly from an operating lever 29, commonly termed in the art a "rocker". On said eye-bolt between said lugs 20 is screwed a nut 25, and by turning said nut on said eye-bolt, the eye-bolt can be moved longitudinally parallel with the lever 17 to adjust the distance of the arm 28 from said lever. After it has been adjusted, a metal strip 30 is inserted in a groove 35 in the outer edge of the lever and its ends are bent down into grooves 45, forming in the sides of the lever 17 continuations of the groove 35, and thus prevents the nut from being turned. Said rocker 29 is fulcrumed by means of a fulcrum pin 31, each end of which is received in a forwardly opening recess 32 in a lug 33 extending forwardly from a portion of the carrier 8. The ends of said pin 31 are thus loosely supported in said lugs. The intermediate portion of said fulcrum pin extends through a stiffening hub 34 of the rocker. The shanks of the jaws 9 and 11 extend on one side only of the carrier 8, and are pivoted to the lever or "rocker" 29 as at 35′ and 35″ respectively so that when the lever is rocked in one direction the jaws will move toward the friction ring and in the other direction will move away from the ring.

36 indicates an extension guide for the outer jaw 9, detachably secured to the carrier by bolts 37, said bolts also passing through gib plates 38, secured on the front side of the extension guide. Tap bolts 40 are also passed through holes 39 in said gib plates 38 and secure the upper portions of said gib plates to said guide. The rear surface of the extension guide is formed with recesses 41 to clear the lugs 33 extending forwardly from the carrier.

To explain more clearly what is the precise invention disclosed herein, it should be stated that, in its original form, the carrier of this style of clutch, which guided and sustained the jaws, was non-detachable, making it impossible to remove the inner jaw without removing the friction ring. Also, there was no positive connection between the levers 17 and 29. Later improvements connected these latter elements positively, but with dangerously exposed adjusting devices; other improvements rendered it possible to remove the inner jaw without removing the friction ring by adding a fulcrum plate detachable from the carrier, so that, when said fulcrum plate was removed, the inner jaw could also be removed in a direction parallel with the shaft. This removable fulcrum plate supported the fulcrum of the rocker in a milled slot and also carried the jaws. The slot for supporting the fulcrum had to be made with great accuracy in relation to the holes for securing the plate in position. If they were not made in proper relation to the holes for securing the fulcrum plate in position, the jaws would not be equally disposed with reference to a common shaft center. Moreover, the fulcrum plate depended for its position on the holding bolts, and, if these became loosened by vibration, the fulcrum plate would no longer be held accurately in position, and, in addition, if the bolts became loosened by vibration, an accident might occur through a release of the fulcrum plate which sustained the jaws, and which was practically the only means for preventing the outer jaw from flying off by centrifugal force.

In my invention I have overcome these weaknesses by providing a positive adjustable link connection for the lower lever, by providing lugs on the carrier to support the extended fulcrum pin, and by bolting an extended guide for the outer jaw having recesses to clear said lugs. This construction avoids the necessity of a removable fulcrum plate, and places the strain of the fulcrum pin directly on the carrier, makes it easy to determine the position of the recesses or bearings for the fulcrum pin in reference to the shaft center, and insures a constant position for these bearings.

By having the shanks of the jaws 9 and 11 both on one side, the outside of the carrier 8 instead of arranging them with the carrier between the shanks as is often and ordinarily the case, and providing an extension guide which is removably secured to the carrier and lies between the shanks, it is possible to readily and easily remove the jaws axially from the ring by simply detaching the guide and without necessitating removal of the friction ring or other parts of the clutch.

I claim:—

1. In a friction clutch, a friction ring, inner and outer shanked jaws adapted to grip said ring, a carrier, said inner jaw being guided by said carrier, a guide plate removably secured to the carrier and serving as a guide for said outer jaw, said carrier and inner jaw being arranged to permit of the bodily removal of the inner jaw in an axial direction upon the removal of the guide plate and means of connection between the jaws which means is fulcrumed directly upon the carrier.

2. In a friction clutch, a friction ring, inner and outer shanked jaws adapted to grip said ring, a carrier, said inner jaw being guided by said carrier, a guide plate removably secured to the carrier and serving as a guide for said outer jaw, said carrier and the inner jaw being arranged to permit of the bodily removal of the inner jaw in an axial direction upon the removal of said guide plate, means for operating said jaws including a rocker pivoted to said shanks of said jaws and directly fulcrumed upon said carrier, said rocker comprising an arm, a lever and a member linked to said arm and slidably adjustable on said lever for the purpose of increasing or decreasing the distance of the rocker arm from the lever.

3. In a friction clutch, a friction ring, inner and outer shanked jaws adapted to grip said ring, a carrier guiding the inner jaw, means for operating said jaws comprising a rocker pivoted to the shanks of the jaws, lugs on the carrier having pivot receiving recesses therein, a pivot for said rocker engaging in said recesses and being removable therefrom by an axial outward movement and a guide plate for said outer jaw removably secured to said carrier.

4. In a friction clutch, a friction ring, inner and outer shanked jaws adapted to grip said ring, a carrier guiding the inner jaw, a guide plate operatively associated with said carrier and jaws and means for operating said jaws comprising a rocker pivoted to the shanks of said jaws, a lever, a member mounted for axial adjustment in either direction upon said lever, means for positively axially adjusting said member in either direction and a link connection between said rocker and said member.

5. In a friction clutch, a friction ring, a carrier, inner and outer shanked jaws adapted to grip said ring, a guide plate operatively associated with said carrier and the jaws, means for operating said jaws comprising a rocker pivoted to the shanks of said jaws, a lever, an eye bolt, lugs on said lever having openings extending therethrough and receiving said eye bolt, said eye bolt having a screw threaded portion, a nut adjustable upon said eye bolt between said lugs and which when turned in either direction will cause axial movement of said eye bolt, and a link connecting said eye bolt with said rocker.

JULIEN A. BRIED.